Sept. 22, 1970     CHUHEI SUZUKI ET AL     3,530,397
LASER ELEMENT
Filed May 27, 1965     2 Sheets-Sheet 1
FIG.1(A)     FIG.1(B)
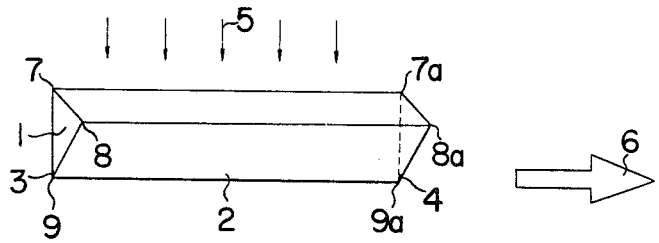
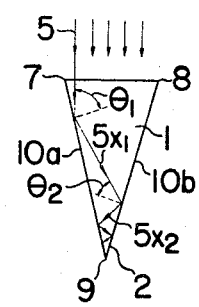
FIG.2(A)     FIG.2(B)     FIG.2(C)
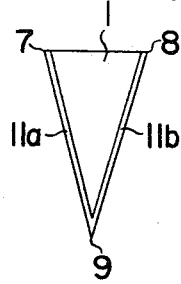
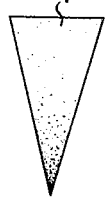
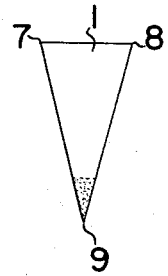
FIG.3(A)    FIG.3(B)    FIG.3(C)    FIG.3(D)
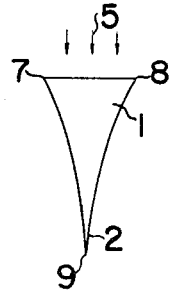
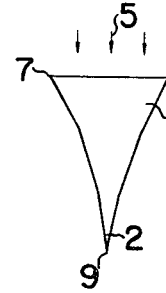
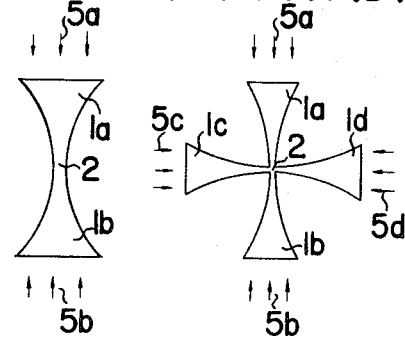
FIG.4
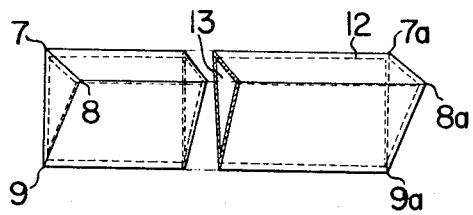

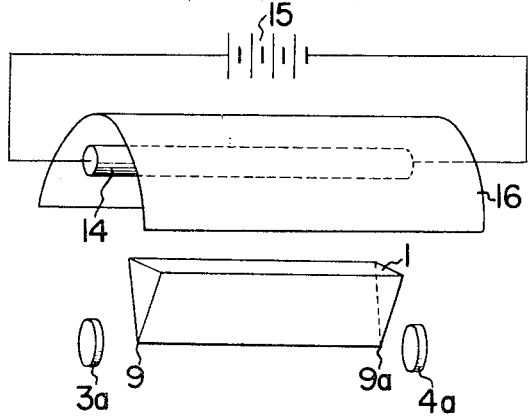
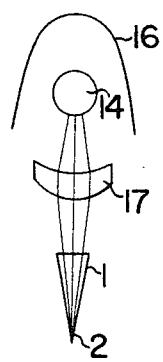
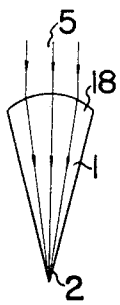
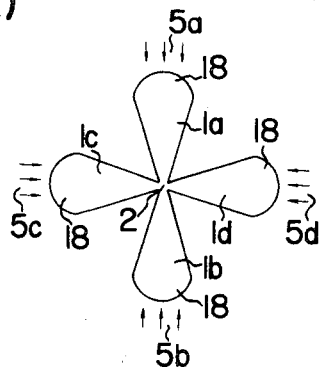
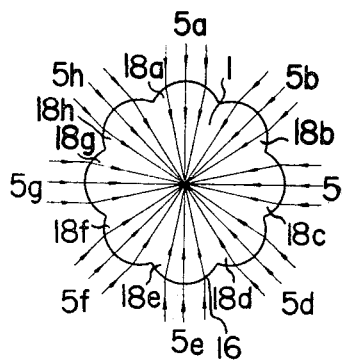
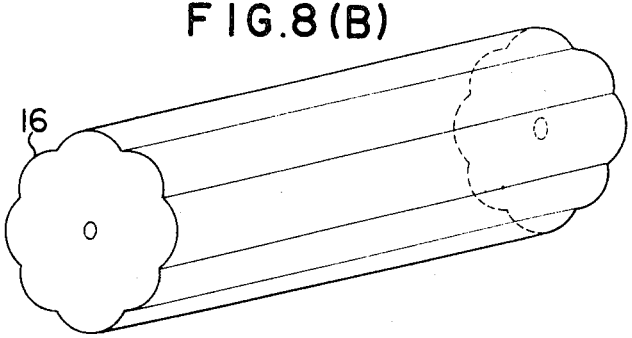

United States Patent Office 3,530,397
Patented Sept. 22, 1970

3,530,397
LASER ELEMENT
Chuhei Suzuki, Nerima-ku, and Takao Tanaka, Nakano-ku, Tokyo-to, Japan, assignors to Kokusai Denshin Denwa Kabushiki Kaisha, Tokyo-to, Japan, a joint-stock company of Japan
Filed May 27, 1965, Ser. No. 459,333
Claims priority, application Japan, June 1, 1964, 39/30,732
Int. Cl. H01s 3/05, 3/16, 3/09
U.S. Cl. 331—94.5         15 Claims

ABSTRACT OF THE DISCLOSURE

A prism-shaped active laser medium is employed which concentrates the pumping light energy applied from the base of the prism to a vertex edge portion by total reflection to effect concentration of the pumping light energy along the vertex edge.

---

This invention relates to laser elements and more particularly to the configuration of the active maser medium in which the light generation and amplification can be performed by stimulated emission of radiation.

There has been heretofore proposed various types of lasers such as the solid type or the gas type. The conventional laser comprises an optical resonator of chamber having two opposed reflective end means at least one of which has a transparent function, an active maser medium such as ruby in the resonator of chamber, and a light power source for pumping the medium. In such a system, a negative temperature conditions results at the medium when the light power source supplies, to the medium, a pumping power exceeding a threshold level, whereby the emission of radiation is stimulated from the medium of the resonator of chamber.

In such conventional lasers, there are some difficulties. In the first place, a large power of continuous supply is necessary continuously to effect the stimulated emission. The large power source of continuous pumping light is difficult to obtain in actual practice. In the second place, the efficiency with regard to the pumping light is considerably low because the pumping power is not supplied so as to concentrate at the resonator of chamber. As a result of such construction of the conventional lasers, it is very difficult to realize a continuous, stimulated emission of radiation.

One proposal for overcoming this difficulty is a laser system in which a reflective mirror formed into an elliptic cylinder is employed for supplying the pumping light, the light power source and the resonance of chamber being respectively arranged at the positions of two focuses of the ellipse. In this case, however, the exact arrangement reflectors and the small design of the chamber, each necessary for securing a maximum emission of radiation with a certain pumping power, are not so easily realized because of difficulty of precise manufacturing work therefor. The cooling device for this system is also not easily realized because the resonator of chamber is pumped in the elliptic cylinder inserted. Moreover, only one pumping power source of a straight lamp can be employed so that high pumping power ordinarily cannot be achieved.

Another proposed system is a laser system in which the pumping power is supplied, in the direction of opposed reflectors of the resonator of chamber, through a conical medium attached with one end of an active maser medium. In this system, the pumping power is supplied only to said one end portion of the resonator of chamber, so that uniform pumping over the resonator of chamber can not be carried out. Moreover, derivation of the stimulated emission of radiation from the pumping light is considerably difficult since said two energies are arranged in parallel.

One object of the present invention is to provide a laser element achieving a high pumping efficiency with respect to the supplied power.

Another object of the invention is to provide a laser element capable of easily cooling the resonator of chamber.

A further object of the invention is to provide a laser element capable of easily deriving the stimulated emission of radiation from the pumping energy.

Said object and objects of this invention have been attained by a laser element, comprising an optical resonator composed of two opposed reflective means at least one of which has a transparent function, an active maser medium arranged between the two reflective means, and a concentration means, directly associated with the active maser medium, for uniformly concentrating over the optical resonator a pumping energy being applied in a direction substantially perpendicular to the axis of the resonator, whereby when the pumping energy is applied through the concentration means, a laser oscillation is generated at the resonator and derived through the reflective means.

The novel features of this invention are set forth with particularity in the appended claims. This invention, however, both as to its construction and operation together with further advantages thereof, may best be understood by reference to the following description, taken in connection with the accompanying drawings, in which:

FIGS. 1(A), 4 and 8(B) are perspective views of the laser elements of this invention;

FIGS. 1(B), 2(A), 2(B), 2(C), 3(A), 3(B), 3(C), 3(D), 7(A), 7(B) and 8(A) are sectional views of the laser elements of this invention; and FIGS. 5 and 6 are, respectively, perspective and sectional views of laser systems using laser elements of this invention.

Referring now to FIG. 1(A), there is shown a laser element in which construction of the element of the present invention is, as an example, embodied. The laser element comprises an active maser medium and an optical resonator of chamber 2. The maser medium 1 is composed of an optically transparent body of negative temperature medium, such as ruby or glass including an active maser material, and formed into a triangular prism. The optical resonator of chamber 2 is composed of one edge of the triangular prism having two opposed reflectors 3 and 4 which are respectively disposed at the two ends of the edge. References 7, 8 and 9 or 7a, 8a, and 9a designate corners of the triangular prism. The pumping light power is supplied to the plane 7–8–8a–7a in the direction of arrows 5.

FIG. 1(B) shows an example of the projection path of the pumping light 5. The greater part of the pumping light 5 is injected into the medium 1 and reaches to a plane 7–9–9a–7a, designated by 10a, which reflects the light 5 by total reflection if the incidence angle $\theta_1$ is greater than the critical angle $\phi$ of the total reflection. The reflected light $5x_1$ is then advanced to a plane 8–9–9a–8a designated by 10b. When the incidence angle $\theta_2$ in this case is also greater than the critical angle $\phi$, the light $5x_1$ is reflected by total reflection and advanced along the path indicated by arrow $5x_2$. Accordingly, the pumping light is advanced to the edge 9–9a and concentrated at the resonator of chamber 2 unless the incidence angles $\theta_1$, $\theta_2$ . . . are smaller than the critical angle $\phi$. As a result of this concentration the resonator of chamber 2 is highly pumped by the pumping light 5 concentrated in the above described manner, whereby a negative temperature is produced in the medium 1 of the resonator of chamber 2. The emission of radiation in accordance with the negative temperature is stimulated, in the direction of the arrow 6, through the reflector 4 having a slight transparent function.

In the case where the planes 7–9–9a–7a and 8–9–9a–8a have reflective means, such as mirrors 11a and 11b shown in FIG. 2(A), the pumping light is further concentrated near the edge 9–9a unless the incidence angles $\theta_1, \theta_2 \ldots$ are zero. When the incidence angles $\theta_1, \theta_2 \ldots$ are exactly equal to or slightly exceed a right angle, the pumping light returns toward the light power source. Accordingly, if a reflective means is arranged at the back of the light power source, such returned light can be utilized again for pumping. As a result of such arrangement, more effective pumping can be carried out than in the case of the element shown in FIGS. 1(A) and 1(B).

A part of the pumping light 5 is dissipated in the paths designated as $5x_1, 5x_2 \ldots$ in the medium 1. Accordingly, the pumping efficiency becomes higher if the ion density of the maser material is diluted except near the resonator of chamber 2 as shown in FIG. 2(B). This effect can be obtained also when the ion density is graded so as to be concentrated toward the edge of the resonator of chamber 2, as shown in FIG. 2(C).

It is necessary that all surfaces of the medium 1 be made extremely smooth in order to inject or reflect the pumping light with high efficiency. With reference to the reflectors 3 and 4, it is also necessary that they have extremely high reflective functions; but one of them must have a slight transparent function so that the stimulated emission can be derived therethrough. For this slight reflective function, a thin reflective layer or a reflective mirror with a small hole, for example, may be used.

In order to supply higher energy of pumping light to the medium 1, it is desirable to make the length 7–8 larger. In the case where the edge angle <798 is constant, the longer the length 7–8 becomes, the longer will the distance from the plane 7–8–8a–7 to the edge 9–9a become, whereby extinction of the pumping light in the medium 1 will also become greater. On the other hand, in order to concentrate the pumping light at a position nearer the edge 9–9a, it is desirable to make the edge angle <798 smaller. In such a case, the pumping light proceeds more closely to the edge 9–9a by multiple reflections. If the length 7–8 is constant, however, the smaller the angle <798 becomes, the longer will said distance from the plane 7–8–8a–7a to the edge 9–9a become; so that dissipation of the pumping light in the medium 1 will also become larger. Accordingly, the magnitudes of the edge angle <798 and the distance from the plane 7–8–8a–7a to the edge 9–9a must be determined with consideration of the strength of the pumping light, the refractive index of the medium 1, and the ion density of the master material in the medium 1, and other factors. In the case when the reflective layers 11a and 11b are attached to the medium 1, it is possible to make the edge angle <798 larger.

For the configuration of the medium 1, a different arrangement in which said planes 7–9–9a–7a and 8–9–9a–8a become curved surfaces as shown in FIGS. 3(A) and 3(B), or a plurality of prisms are so disposed relative to one another as to have a common chamber resonator 2 as shown in FIGS. 3(C) and 3(D), can be employed. Of course, other prisms as illustrated in FIGS. 1(A), 2(A), 2(B) and 2(C) can be so constructed.

In the case of a liquid, maser material, a frame comprising, for example as shown in FIG. 4, a plane 7–8–8a–7a, a plane 7–9–9a–7a, a plane 8–9–9a–8a, a plane 7–8–9 and a plane 7a–8a–9a can be employed. A liquid laser material is accommodated in this frame. Reflective means 3 and 4 are deposited on both ends of the edge 9–9a. This embodiment of the invention can be used in a manner substantially similar to those described above.

In each of the example described above, the reflective means 3 and 4 can be arranged separately from the two ends of the edge of the prism, as shown in FIG. 5.

For the active maser material, a conventional maser material such as ruby can be employed. In addition to ruby, an optically transparent body, such as glass, including ion or ions of a rare earth element (or rare earth elements), such as $Nd^{3+}$, can be employed as the active maser material. Europium chelates, such as benzoylacetonate (EuB) or dibenzoylmethide (EuD), can be employed as the active liquid maser material.

FIG. 5 illustrates one example of the laser system employing the laser element of this invention. The system comprises an active maser medium 1, reflectors 3a and 4a arranged separately from the ends of edge 9–9a and forming the resonator of chamber 2, a pumping light power source 14 (for example, a mercury arc lamp), an electric source 15 for the source 14, and a reflector 16 for reflecting the pumping light from the source 14 to the element 1. Since the operation of this system can be easily understood from the above description, detailed explanation of this system is omitted. In this system, if a convex lens 17 is inserted between the source 14 and the element 1 as shown in FIG. 6(A), more efficient pumping can be carried out.

FIG. 7(A) shows another laser element of this invention in which the pumping light 5 is concentrated into the resonator of chamber 2 by a concentration function of a head 18. Extremely precise design of the radius of curvature of the head 18 is not necessary since the pumping light 5 so concentrated is caused to travel toward the resonator of chamber 2 by the reflective function of side surfaces as mentioned above. FIG. 7(B) illustrates a laser element in which a plurality of such laser elements are so arranged as to have a common resonator of chamber 2. In this case, the pumping light energies 5a, 5b, 5c and 5d are supplied about the element similarly as in the cases shown in FIGS. 3 (C) and 3(D).

FIGS. 8(A) and 8(B) show another laser element of this invention in which the medium 1 is formed into a rod with an epicycloid-like section 16. In this element, the pumping light rays 5a, 5b, 5c . . . supplied are all concentrated toward the resonator of chamber 2 by the concentration functions of respective heads 18a, 18b . . . so that highly efficient pumping is effected. This configuration can be applied to an active liquid laser medium by the use of a frame with such epicycloid-like section.

Results of test with respect to the laser elements of this invention are, for example, as follows:

(1) Waveforms of the stimulated emission of radiation in the case of pulsive pumping have regular configurations without spikes and show regular relaxation oscillation. Accordingly, it is confirmed that the oscillation condition is improved in comparison with that of oscillation of a conventional laser with random spikes.

(2) In the case where the edge angle is 20 degrees, it is confirmed that the center of the stimulated emission of radiation of the element having no side reflectors 11a and 11b) is in a position at a distance of approximately one fifth of total height from the top edge 9–9a. This result establishes the concentration function desired.

(3) Provided that the pumping light is not excessively above the threshold level, it is confirmed that the ocsillation mode is approximately equal to $TEM_{10}$.

The laser element of this invention can be easily cooled only at the resonator of chamber, (in particular, in the case of single prism construction). Accordingly, continuous emission of radiation can be stimulated more readily than in the conventional laser element. Since this laser element can be formed without highly precise design and configuration, manufacturing thereof is easy and economical.

Since it is obvious that many changes and modifications can be made in the above described details without departing from the nature and spirit of the invention, it is to be understood that the invention is not to be limited

What we claim is:

1. A laser comprising: an elongated prism-shaped, optical resonator having a maser medium of generally triangular cross section having two sides joined together defining a small angle for directing pumping light energy applied perpendicularly to a third side of said triangular cross section to a vertex edge of said triangular cross section by total reflection, means for pumping light into said resonator along said third side opposite to said vertex edge and for applying said pumping light substantially perpendicular to the longitudinal axis of said resonator to said third side of said resonator along the full length thereof to effect concentration of the light energy along said vertex edge, light reflectors comprising flat ends on said optical resonator oppositely disposed adjacent the flat ends of said resonator reflecting light inwardly of said resonator, one of said ends being partially light-reflective and transparent to coherent light, and said two sides and said third side extending substantially the full length of the longitudinal axis of said elongated optical resonator.

2. A laser according to claim 1, in which said optical resonator comprises a solid prism.

3. A laser according to claim 2, in which said solid prism has flat sides comprising said light-reflective means.

4. A laser according to claim 1, in which said optical resonator side corresponding to said base is flat.

5. A laser according to claim 4, in which said optical resonator has concave sides joining to define said vertex edge and comprising said light-reflective means.

6. A laser according to claim 4, in which said optical resonator has flat sides joining to define said vertex edge and comprising said light-reflective means.

7. A laser according to claim 1, in which said optical resonator light-reflective means comprises a resonator cavity containing liquid.

8. A laser according to claim 1, in which said optical resonator light-reflective means comprises sides joining to define said vertex edge.

9. A laser comprising, an elongated optical resonator having an epicycloid cross section, said resonator comprising a plurality of outwardly convex side surfaces, a pumping light means for pumping light energy into said resonator at each of said convex sides and radiating said sides with light substantially along the full length of said sides of said resonator, light-reflective end surfaces on said resonator, one of said ends being partially light-reflective and transparent to coherent light, and said sides extending substantially the full length of said optical resonator.

10. A laser according to claim 9, in which the optical resonator comprises a rod of solid material concentrating the pumping light applied to said side surfaces substantially at said longitudinal axis.

11. A laser comprising, an elongated optical resonator comprising a plurality of prism-shaped sections each having a generally triangular cross section, said sections being disposed with their respective vertex joined along a longitudinal axis of said optical resonator, sources of pumping light for pumping light energy into said resonator along sides of each prism-shaped section corresponding to a base of said generally triangular cross section opposite to vertices of said sections and for applying said pumping light along the full length of said sides, light-reflective oppositely disposed flat ends on said optical resonator reflecting light inwardly of said resonator, one of said ends being partially lighted-reflective and transparent to coherent light; and said sides extending the full length of the longitudinal axis of said elongated, optical resonator.

12. A laser according to claim 11, in which said sides of said prisms-shaped sections opposite to said vertices are flat.

13. A laser according to claim 12, in which other sides of said sections are flat.

14. A laser according to claim 11, in which said prism-shaped sections are solid.

15. A laser according to claim 11, in which said prism-shaped sections comprise a liquid.

References Cited

UNITED STATES PATENTS

| | | | |
|---|---|---|---|
| 3,087,374 | 4/1963 | Delvin et al. | 331—94.5 |
| 3,196,366 | 7/1965 | Simpson | 331—94.5 |
| 3,230,474 | 1/1966 | Keck et al. | 331—94.5 |
| 3,297,958 | 1/1967 | Weiner | 331—94.5 |
| 3,354,405 | 11/1967 | Bebb et al. | 331—94.5 |
| 3,372,972 | 3/1968 | Schmidt | 350—160 |
| 3,225,307 | 12/1965 | Weissman | 331—94.5 |

OTHER REFERENCES

Wolf: Electronics, vol. 36, No. 15, Apr. 26, 1963, pp. 26–27.

RONALD L. WIBERT, Primary Examiner

R. J. WEBSTER, Assistant Examiner